United States Patent [19]

Shiba

[11] Patent Number: 4,993,008

[45] Date of Patent: Feb. 12, 1991

[54] MULTIPLE-DISK PLAYER WITH AUTOMATIC FADE-OUT FUNCTION

[75] Inventor: Takahumi Shiba, Tokorozawa, Japan

[73] Assignee: Pioneer Electronic Corporation, Tokyo, Japan

[21] Appl. No.: 247,618

[22] Filed: Sep. 22, 1988

[30] Foreign Application Priority Data

Dec. 19, 1987 [JP] Japan ................. 62-322505

[51] Int. Cl.⁵ ............... H04Q 11/04; G11B 27/02
[52] U.S. Cl. ............................ 369/3; 369/2; 369/54; 369/36
[58] Field of Search ............. 369/3, 2, 36–39, 369/33, 54, 58

[56] References Cited

U.S. PATENT DOCUMENTS 4,855,979  8/1989  Kimura et al. ................. 369/38

FOREIGN PATENT DOCUMENTS 60-115067  6/1985  Japan .
62-14369   1/1987  Japan .
63-33384   6/1988  Japan .

*Primary Examiner*—Stuart S. Levy
*Assistant Examiner*—Hoa Nguyen
*Attorney, Agent, or Firm*—Foley & Lardner, Schwartz, Jeffery, Schwaab, Mack, Blumenthal & Evans

[57] ABSTRACT

A multiple-disk player which detects a time period during which for the player operates in the non-playback mode after the playback start command is issued and calculates a time period value on the basis of the difference between the current value of the time information datum read out of the disk and its preceding value; the detected non-playback mode time period is added to the playback time period to produce the total time period; and performs a fade-out operation for music being played back when such total time period reaches a given allowable time period. Consequently, it is possible to quickly and accurately check the fade-out operation even before all the pieces of music to be played back are actually played back.

3 Claims, 2 Drawing Sheets

MULTIPLE-DISK PLAYER WITH AUTOMATIC FADE-OUT FUNCTION

BACKGROUND OF THE INVENTION

1. Field of the Invention

The present invention relates to a disk player, and more particularly to a multiple-disk player in which a plurality of digital audio disks (hereinafter simply referred to as a disk) are held and automatically changed for playing back a plurality of pieces of music in sequence.

2. Description of the Prior Art

A multiple disk player has recently been developed on which, for example, at least one magazine is mounted. The magazine holds a plurality of disks each carrying thereon a plurality of pieces of music. The multiple-disk player performs its playback operation in a selected manner such as: a sequential manner in which a plurality of the disks are sequentially played back in the order of the disk positions and of the music numbers carried thereon (hereinafter referred to as sequential playback); a programmed manner in which a plurality of the disks are played back in a predetermined sequence determined without respect to the disk positions and the music numbers (hereinafter referred to as programmed playback); and a random manner in which those music pieces on the disks are randomly played while designating a music number determined on the basis of a random number obtained from a suitable random-number source such as a table of random numbers or the like (hereinafter referred to as randomly-selected playback).

In case that music pieces recorded on the disk are copied into a cassette tape through the so-called dubbing operation, the cassette tape often ends off before the last one of the music pieces is entirely recorded on the cassette tape. In this case, such a music piece recorded on the cassette tape stops suddenly when it is played back on the tape recorder, which gives the user an unpleasant feeling. In order to avoid such an unpleasant situation, the disk player may be provided with a predetermined playback period of time depending on the length of a cassette tape, and upon the lapse of such predetermined playback period of time, the disk player automatically decreases an audio signal level reproduced from the disk being played back, which is the so-called "fade-out operation".

Since, in the case of a single-disk player, the TOC (Table of Contents) information can be used for determining a playback period of time by which the disk player can start the fade-out operation at a suitable timing (hereinafter referred to simply as the fade-out timing), upon the completion of the playback operations for the desired number for music pieces. Since, on the other hand, the TOC information is inherent to each disk, the total playback period cannot be previously determined without reading out the TOC information of all disks mounted on the disk player, in case of the multiple-disk player. Furthermore, disk-changing periods of time required to change the disks being played back in the multiple-disk player cannot be determined prior to actual playback operations. Therefore it is impossible for the multi-disk player to carry out the fade-out operation in the same manner as that of the single-disk player.

A playback period of time may be manually measured by means of a timer. When the thus measured playback period of time reaches a predetermined amount of time corresponding to a capacity of a tape, the fade-out operation can be carried out in the player. Such method takes a relatively long time since the actual playback operation is to be once performed and makes it difficult for the user to quickly confirm whether or not the fading-out function of the disk player may actually appear at the dubbing operation.

SUMMARY OF THE INVENTION

It is an object of the present invention to provide a multiple-disk player for accurately performing the fading out operation during the dubbing operation while quickly determining a total playback time period.

According to the present invention, there is provided a multiple-disk player for sequentially playing back a plurality of music pieces recorded on a plurality of disks one of which is automatically selected, which comprises: first means for measuring a period of time during which said player takes a non-playback mode (hereinafter referred to a the non-playback mode period of time) after a playback command is issued; second means for calculating a playback time period on the basis of a difference between current and preceding values of the time code read out from a disk being played back: third means for adding the non-playback mode time period to the playback time period to produce a total period of time; and fourth means for issuing a fade-out command when the total period of time reaches a predetermined amount of time corresponding to the capacity, or length, of a recording tape.

DESCRIPTION OF THE PREFERRED EMBODIMENTS

An embodiment of the present invention will be hereinbelow described in detail with reference to the drawings.

Figure 1:
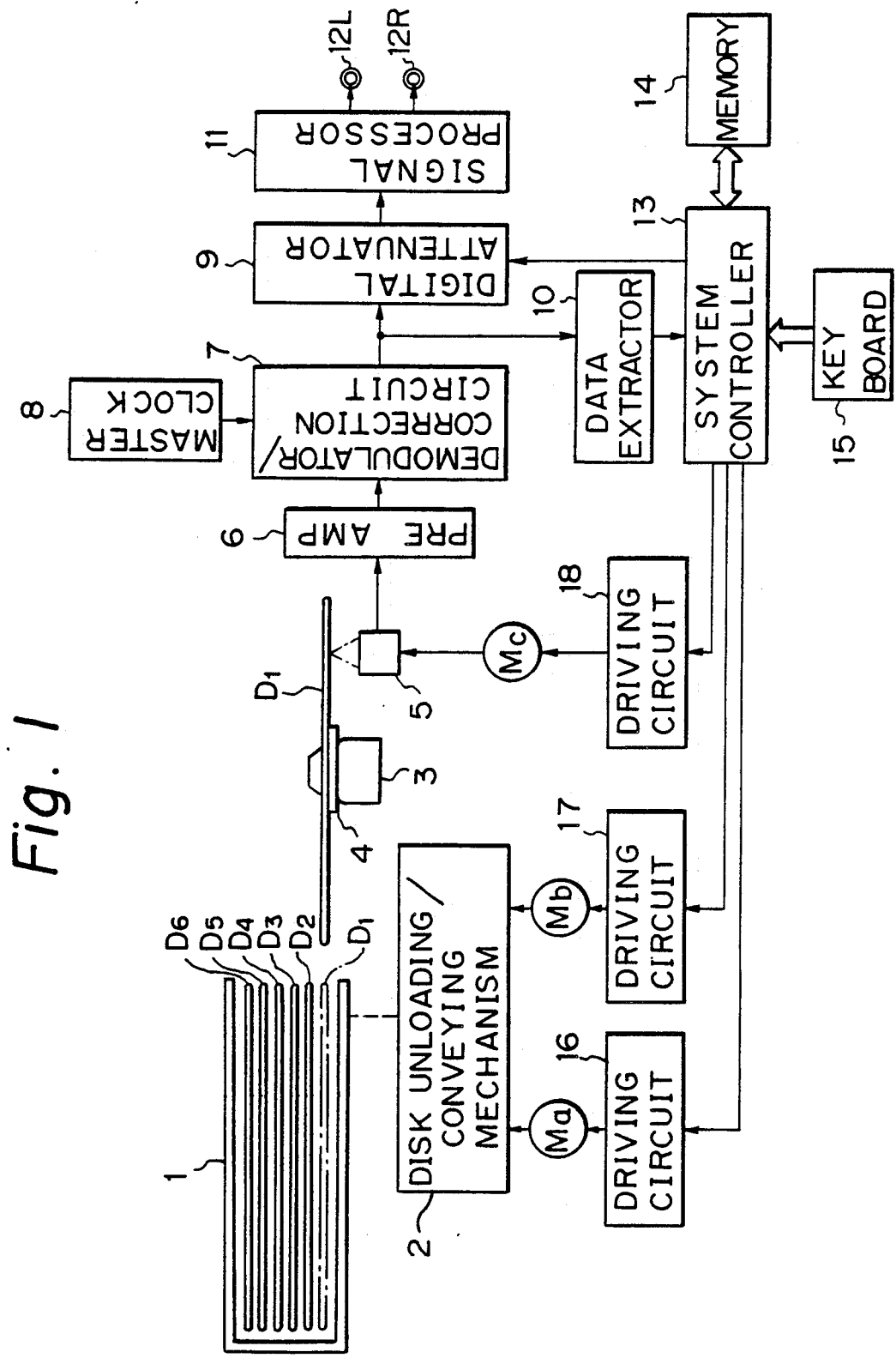
FIG. 1 is a schematic block diagram of a multiple-disk player provided with an apparatus according to the present invention for carrying out the fade-out operation for audio signal resulted from the playback operation in the player.

In FIG. 1, there is shown a multiple-disk player which carries out the fade-out operation according to the subject invention. As shown in FIG. i, a magazine 1 carries a plurality of trays, for example, six trays (not shown) therein, the trays being arranged in a stacked manner and spaced apart from each other at intervals of a predetermined distance, while held projectable from and retractable into the magazine 1 These trays carry six disks $D_1$ to $D_6$, respectively. The magazine 1 is detachably mounted at a predetermined mount portion of a main body, or a housing, of the player. In the multiple-disk player shown in FIG. 1, a disk unloading and conveying mechanism 2 selects a desired one of the disks $D_1$ to $D_6$ from the magazine I thereby to unload and convey the selected disk to a turntable 4 fixed to a rotary shaft of a spindle motor 3. The thus conveyed disk is then clamped on the turntable 4 by means of a clamper (not shown).

The disk unloading and conveying mechanism 2 comprises: a disk-unloading member for selecting and unloading a desired one of the trays (not shown) from the magazine 1 so that a desired one of the disks $D_1$ to $D_6$ housed in the trays is conveyed to the turntable 4; a clamp mechanism (not shown) for clamping the thus conveyed disk $D_1$ on the turntable 4; a transferring plate (not shown) for changing the position of the unloading member in a stacking direction of the disks $D_1$ to $D_6$ stacked in the magazine I, relative to the magazine 1; and sensors (not shown) for detecting the position of the transferring plate and for detecting the clamp mechanism in its operation. In the disk unloading and conveying mechanism 2 having the construction shown, the transferring plate is driven by a motor $M_a$. On the other hand, the disk-unloading member is driven by a motor $M_b$. The position of the disk-unloading member is changed by driving the transferring plate, so as to make it possible to select a desired one of the disks $D_1$ to $D_6$. The magazine 1 and the disk unloading and conveying mechanism 2 are, for example, disclosed in detail in Japanese Patent Laid-Open No. 62-14369.

As shown in FIG. 1, an optical pickup unit 5 of the multiple-disk player reads information recorded on the desired disk $D_1$ which is mounted on the turntable 4. The optical pickup unit 5 includes a laser diode functioning as a light source; an optical system having an objective lens; a photo-detector for receiving light reflected from the disk on the turntable; a focus actuator for controlling the position of the objective lens in the optical axis thereof with respect to an information-recorded surface of the disk; and a tracking actuator for controlling the position of the light beam in a radial direction of the disk, the beam being so issued from the pickup unit 5 as to be directed to a target recorded track on the disk. The optical pickup unit 5 is mounted on a carriage (not shown) which is movable into a radial direction of the disk and is driven by a motor $M_c$.

A read-out output signal issued from the optical pickup unit 5 is supplied to a demodulator and correction circuit 7 through a pre-amplifier 6. Thereafter, the thus issued read-out output signal, which is an EFM (Eight to Fourteen Modulation) signal, is subjected to EFM demodulation and error correction in the demodulator and correction circuit 7. The resulting data are stored in a memory (not shown) such as RAM or the like incorporated in the circuit 7. The data thus stored in the memory are subjected to data processing carried out in synchronism With a master clock signal issued from a master clock generator 8, whereby de-interleaving operation of the data and error correction of the data through a parity check for the data are carried out. An output signal issued from the demodulator and correction circuit 7 is supplied to both of a digital attenuator 9 and a data extractor circuit 10. The digital audio signal having a controlled amplitude In the digital attenuator 9 is processed through a signal processor circuit 11 comprising a digital-to-analog (D/A) converter, deglitcher, etc, and then supplied to left and right audio output terminals 12L and 12R of left and right channels. In the data extractor circuit 10, the data of the so-called sub-code in the so-called CD format is extracted. The thus extracted sub-code data is supplied to a system controller 13.

The system controller 13 may be composed of microcomputers, which control the motors $M_a$, $M_b$ and $M_c$ through driving circuits 16, 17 and 18, respectively, so as to perform either one of the sequential playbacks, programmed playbacks and the random playbacks in the multiple disk player. In a multiple-disk player having the above construction' a timer incorporated in the player measures a period of time when the player takes a non-playback mode such as a search mode, a disk-changing mode or the like (hereinafter referred to as the non-playback mode period of time]after issuance of a playback start command. When the player is operated in a playback mode, i.e. a time datum obtainable mode such as a usual playback mode a scan mode or the like, a calculator mean operates to calculate the playback time period on the basis of a difference between current and one-time preceding values of a time code such as the so-called "Q" data in the compact disk format, which is read out of the disk and constitutes an output datum issued from the data extractor circuit 10. An adder operates to add the thus obtained playback time period to the above non-playback time period to produce a total time period. The above calculation is repeated in synchronism with the clock signal. In the above calculation, a memory 14 such as a RAM (Random Access Memory) or the like is employed. When the total time period reaches a predetermined amount of time required to start the fade-out operation, the audio signal issued from the digital attenuator 9 is gradually decreased in amplitude to carry out or realize the fade-out operation.

Now, a flowchart of a program of a processor of a system controller 13 shown in FIG. 1 for controlling the fade-out operation will be hereinbelow described in detail. It is first assumed that an allowable recording time T corresponding to the length of the tape is preset by the user through a keyboard 15 of the plaYer shown in FIG. 1.

Figure 2:
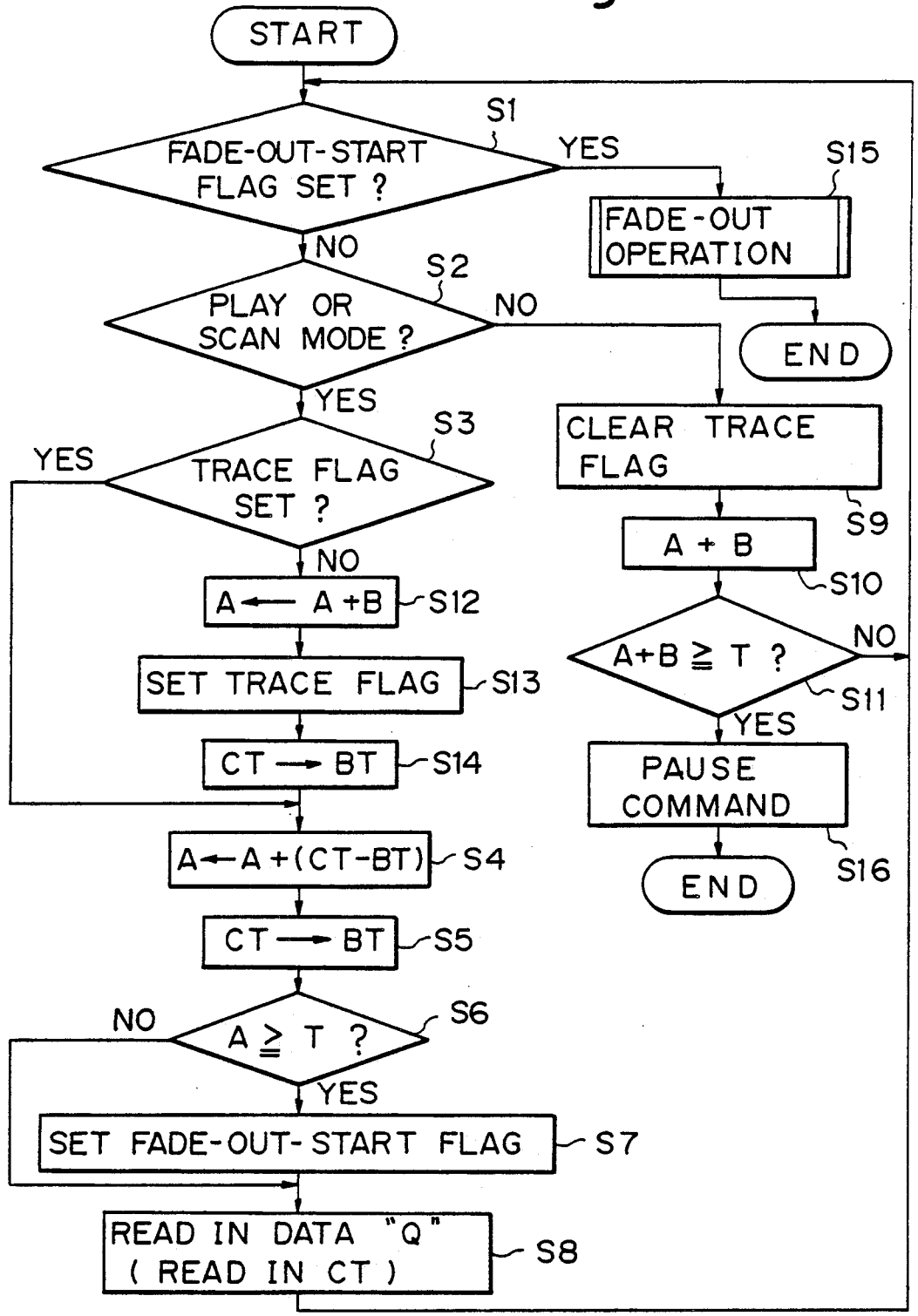
FIG. 2 is a flowchart of a program for controlling the fade-out operation carried out by a processor of a system controller employed in the multiple-disk player shown in FIG. 1.

As is clear from the floWchart shoWn in FIG. 2, in step "S1" of the floWchart, it is first determined whether a fade-out-start flag is set or not. In case that the fade-out-start flag is not set, it is determined whether a playback mode such as the play mode and the scan mode is set or not at a subsequent step "S2". In case the playback mode is set, it is determined at a step "S3" whether a trace completion flag indicating a calculation of a total time period just before the start of the playback (time datum obtainable) mode. In case the trace completion flag is determined as being set in the step "S3", a difference (CT−BT) between a current, or present-time, value of a time datum read out of the disk and its preceding value, is added to a total time period calculated in the preceding cycle, so as to produce a new total time period "A" integrated up to the current cycle. After that, in a step "S5", the current value "OT" is converted into a preceding value "BT" for the next cYcle. Then, in a subsequent step "S6", it is determined whether the total time period "A" has reached the time period "T" or not. In case the total period of time "A" is determined to have reached such a time period "T", in step "S7", the fade-out-start flag is set. In a subsequent step "S8", a next time datum is read in. Thereafter, the program returns to the step "S1". When it is determined in the step "S1" that the fade-out-start flag has already been set, the step "S1" is followed by a sub-routine S15 for the fade-out operation. In the fade-out subroutine, the control data for controlling the attenuator 9 is gradually changed so as to gradually increase the attenuation degree of the attenuator 9 to perform the fade-out operation and finally a pause command or a stop command may be issued. When, in step "S6", it is determined that the total period of time "A"

does not reach the time period "T" required, the step "S6" is directly followed by the step "S8".

When, in step "S2", it is determined that the time-datum obtainable mode is not set, that is, the player is operated in the non-playback mode, the preceding trace completion flag is cleared in step "S9". At this time, a timer incorporated in the player for measuring a predetermined time period "B" during which the player has operated in the non-playback mode is cleared, to make it possible that the timer again starts the measurement of the time period "B". Such measurement is carried out in a separate sub-routine which is initiated by a constant frequency interruption. After that, in a step "S10", the last value "B" just before being cleared is read in and added to the last total period of time "A" thereby to produce a new total period of time ("A"+"B"). In a subsequent step "S11", it is determined whether such total period of time ("A"+"B") reaches the time period "T" previously set by the operator. In case the total period of time ("A"+"B") does not reach the time period "T", the step "S11" is followed by the step "S1". On the other hand, in case it is determined that the total period of time ("A"+"B") has reached the time period "T", step "S11" is followed by step S16 during which a pause mode command is issued, in addition to a display command, for example, a command for energization of a LED (Light Emitting Diode).

When, in step "S3", it is determined that the trace completion flag is not set, this means that the operation of the player is changed from the non-playback mode, such as the search mode and the disk-changing mode, to the time datum obtainable mode, such as the play mode and the scan mode, and, therefore, the time period "B" is added to the total period of time "A" to produce a renewed total period of time "A" in step "S12". After that, in a subsequent step "S13", the trace completion flag is set, and then the current value "CT" is converted into preceding value "BT" in a step "S14" which is followed by step "S4".

As described above, in the multiple-disk player according to the subject invention, after the playback start command is given, a time period datum "B" for the non-playback mode is measured; a playback time datum is calculated which equals a difference between the current value "CT" of a time datum obtained from the information signal read from the disk and its preceding value "BT"; the above time datum "B" is added to such playback time datum so as to produce a total period of time "A"; and When the thus produced total period of time "A" reaches a previously given time period "T", the fade-out operation is carried out. In the multi-disk player provided with the above arrangement in which the total period of time datum "A" is calculated Which corresponds to the total time period spent for operating the multiple-disk player to perform play back operations in sequence for different music pieces, it is possible to quickly and accurately check the fade-out operations even when all the music pieces to be played back are not actually played back. For example, by operating the player in the search mode through all the pieces of music programmed to be played back, it is possible to quickly and accurately check the fade-out operations when all pieces of music programmed are actually played back. In addition, by repeatedly operating the player in the scan mode, it is possible to detect the period of time required to play back all the pieces or a predetermined number of pieces of music contained in the magazine since the total time period "A" represents a time period required for the play-back including the disk-changing periods, thereby making it possible to set or indicate to the operator the desired time for starting the fade-out operation by means of a suitable display, which enables the multiple-disk player according to the present invention to carry out the fade-out operation in more precise manner.

As described above, in the multiple-disk player according to the present invention, the total period of time for operating the player to perform playback operations for the plurality of music pieces is measured when the playback start command is given; the playback or scan period of time is calculated on the basis of the difference between the current value of the time information read out of the disk and its preceding value; the non-playback mode period of time is added to the playback period of time to produce the total period of time: and fade-out operation of music played back is carried out when such a total period of time reaches the amount of time for starting the fade-out operation. Consequently, in the multiple-disk player according to the present invention, it is possible to quickly and accurately check the fade-out operations even before all the pieces of music programmed to be played back are played back in real time. Namely, by repeatedly operating the multi-disk player in the scan mode, it is possible to quickly and accurately check the fade-out operations for the actual playbacks of the all pieces of music programmed to be played back.

What is claimed is:

1. In a multiple-disk player for playing disks, each of said disks carrying thereon an information signal including a plurality for music pieces having a time axis and time data distributed along said time axis of said music pieces while automatically selecting any one of said disks, the improvement, comprising in combination:

time-setting means for setting a certain time period;

period-measuring means for measuring an intermediate time period spent until said player completes a non-playback mode after issuance of a playback start command;

extracting means for consecutively extracting said time data from said information signal obtained from a selected one of said disks being played back;

calculating means for calculating a difference between consecutive neighboring ones of said time data, for calculating a playback time period on the basis of said difference and for calculating a total time period by adding said intermediate time period to said playback time period; and fade-out control means for carrying out a fade-out operation when a value of said total time period reaches a corresponding value of said certain time period.

2. The multiple-disk player as set forth in claim 1, wherein:

said non-playback mode is a search mode.

3. The multiple-disk player as set forth in claim 1, wherein:

said non-playback mode is disk-changing mode.

* * * * *